Patented Dec. 6, 1949

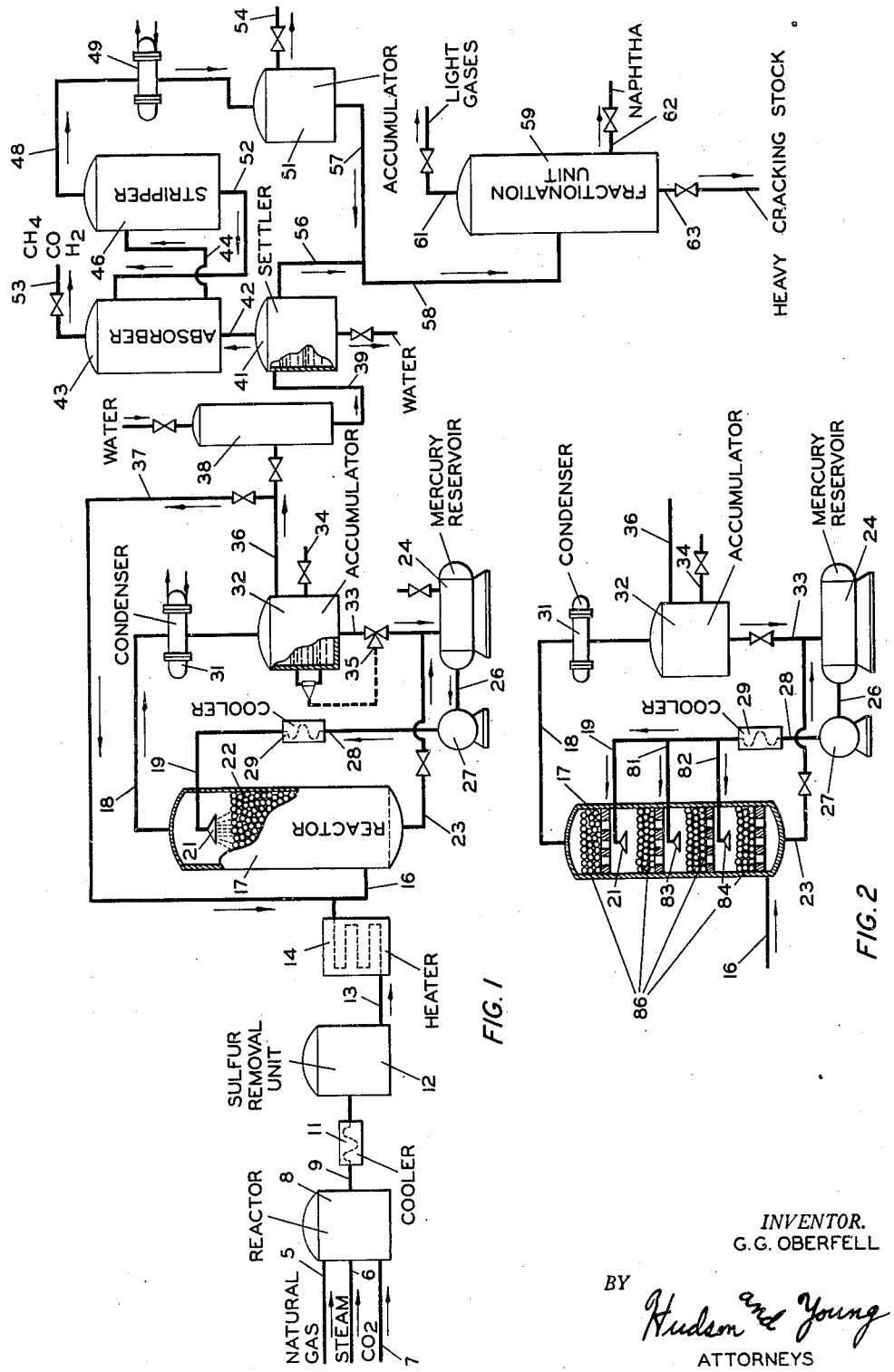

2,490,463

UNITED STATES PATENT OFFICE 2,490,463

SYNTHESIS OF HYDROCARBONS

George G. Oberfell, Bartlesville, Okla., assignor to Phillips Petroleum Company, a corporation of Delaware Application October 22, 1945, Serial No. 623,799

2 Claims. (Cl. 260—449.6)

This invention relates to the synthesis of hydrocarbons. In one aspect this invention relates to the conversion of hydrogen and an oxide of carbon into hydrocarbons. In still another aspect this invention relates to the removal of exothermic heat of reaction liberated during the synthesis of hydrocarbons having more than one carbon atom per molecule by the interaction of hydrogen and carbon monoxide in the presence of a catalyst.

It has been known for some time that hydrogen and carbon monoxide may be made to react exothermically in the presence of certain catalysts and under specific reaction conditions to form hydrocarbons and oxygenated compounds. The formation of hydrocarbons having more than one carbon atom per molecule, especially those hydrocarbons boiling within the gasoline range, is favored by relatively low pressures and low temperatures. In general, the synthesis of hydrocarbons by the hydrogenation of carbon monoxide is accomplished in the presence of a metal chosen from group VIII of the periodic table as a catalyst at pressures below about 500 pounds per square inch gage and at temperatures below about 350° C. The synthesis feed gas comprises a mixture of about 2 moles of hydrogen per mole of carbon monoxide and is prepared by the catalytic conversion of natural gas, steam and carbon dioxide. Characteristically, certain reaction conditions are optimum for the particular metal catalyst being used. Moreover, whether a normally gaseous, liquid or solid hydrocarbon is produced depends upon the reaction conditions, especially temperature, which are used to effect the synthesis. Accurate control of the reaction conditions and dissipation of excess heat liberated by the exothermic nature of the reaction are necessary to obtain an optimum yield of the desired product.

When hydrogen and carbon monoxide react to form hydrocarbons, part of which boil in the gasoline range, an amount of heat is evolved equivalent approximately to one-fifth of the heat of combustion of the original reactants converted. The liberation of large quantities of heat during the course of this reaction has presented a serious obstacle to the industrial use of this process, since it is essential to maintain the temperature of reaction within very narrow limits in order to obtain high yields of desirable products. Excessive rise in temperature during the reaction caused by the liberation of heat results in the formation of methane rather than the more desirable heavier hydrocarbons.

Both the hydrocarbon product and the heat of reaction of carbon monoxide and hydrogen are variable and depend on the catalyst and conditions of operation used. The formation of the methylene radical brings about an exothermic heat of reaction of about 48,000 calories per mole of methylene formed and is the minimum amount of heat that can be released from two moles of hydrogen reacting with one mole of carbon monoxide. However, in actual practice, the formation of higher hydrocarbons, such as by polymerization of methylene, brings about an additional heat of reaction which results in the liberation of heat exceeding 48,000 calories.

The application of thermodynamic principles to the hydrogenation of carbon monoxide indicates the feasibility of producing those hydrocarbons boiling within the gasoline range at accurately controlled temperatures. The approximate linear free energy-temperature relations for the synthesis of methane, ethane, normal hexene, normal hexane, and normal octane, are illustrated by the following over-all equations for reactions occurring in the gas phase with nickel or cobalt catalysts. These equations are represented graphically in "The Chemistry of Petroleum Derivatives" by Carleton Ellis, vol. II; 1934, page 1226.

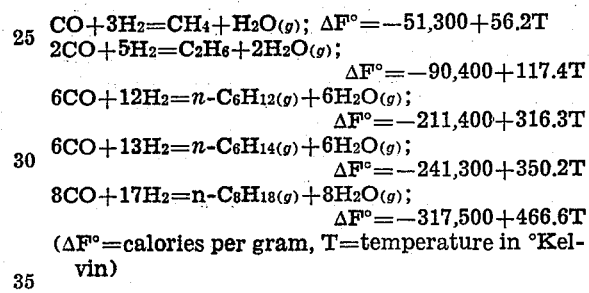

($\Delta F°$ = calories per gram, T = temperature in °Kelvin)

The production of hydrocarbons from carbon monoxide and hydrogen is favored thermodynamically, as is evident from the large negative values of the standard free energy change ($\Delta F°$) for the over-all reactions. In the series, methane, ethane, normal hexane, and normal octane, the free energy change becomes more negative with the size of the molecule so that the formation of higher members of the series is quite feasible. At about 300° C., and atmospheric pressure, it should be possible to obtain any of the paraffin hydrocarbons by reduction of carbon monoxide in the presence of appropriate catalyst. The validity of this conclusion has been confirmed by the isolation and identification of some of the reaction products which included practically all the members of the aliphatic series from ethane to hectopentacontane ($C_{150}H_{302}$).

For a given catalyst, the free energy change for the production of hydrocarbons increases with temperature as is indicated from the above equations. This is true regardless of the nature of hydrocarbons formed. The equations indicate that upon increasing the temperature of reaction, the free energy change becomes less negative.

Assuming all reactions occurring at random, the product having the greatest negative free energy change will predominate. Thermodynamically the tendency to form the heavier hydrocarbons is greatest at relatively low temperatures. At relatively high temperatures the tendency to form methane is greatest, as previously indicated.

The close temperature control required coupled with the highly exothermic nature of the reactions involved presents a most difficult problem in operating on commercial scale. Various methods have been proposed to solve this problem, but with only limited success.

For example, it has been proposed to pass the reacting gases through a plurality of alternate zones containing catalyst and non-catalytic material situated within a reaction chamber, and removing heat of reaction through the walls of the reaction chamber whereby a temperature gradient along the path of the flowing gases is prevented.

It has also been proposed to circulate the reacting gases rapidly through the reaction zone thereby obtaining small conversion per pass and consequently only a small amount of heat liberated per pass.

Processes have also been disclosed wherein the exothermic heat of reaction is removed as it is evolved by utilizing a sufficient quantity of the catalyst and by absorbing the same as sensible heat of the catalyst, separating the heated catalyst from the reaction zone, removing the heat of reaction therefrom by cooling, and again utilizing the cooled catalyst in the reaction zone.

Other processes have been disclosed in which the reaction temperature is controlled by passing the synthesis gas mixture under synthesizing conditions through a plurality of alternate catalyst and cooling zones. Indirect heat exchange is made between the gas and cooling means in the cooling zones to maintain the gas temperature within a predetermined temperature range. Indirect heat exchange within the entire reaction zone is also practiced.

In catalytic processes for converting hydrogen and carbon monoxide to hydrocarbons, especially where use is made of alternate catalyst and cooling zones or alternate catalyst and non-catalyst zones for dissipation of heat of reaction, the size of the reaction chamber is disproportionally large for the amount of conversion which takes place therein in a given time. If, for example, fifty percent of the volume of the reaction chamber is occupied by non-catalytic material or used as cooling zones, a reaction chamber twice as large would be required to obtain a certain space-time yield than would be required in a chamber in which the entire volume is filled with catalyst. Furthermore, if extremely high space velocities and recirculation of the unconverted reactants and gaseous products are employed in order to decrease the quantity of heat evolved, expensive, additional equipment is required for circulating the gases and for efficiently condensing liquid from a high-velocity gas stream. Catalyst erosion also increases when a high-velocity gas stream is employed. Bringing the reacting gases into indirect heat exchange with a circulating cooling liquid works well when the reacting gases are passed through tubes approximately one-half inch in diameter or less; but for tubes of larger diameter, the rate of heat dissipation is insufficient to maintain a constant temperature.

It is, therefore, an object of this invention to provide a method for effecting accurate control of the temperature of reaction in catalytic conversion processes without the aforesaid difficulties.

Another object is the removal of excess heat of reaction from a reaction zone above that required to maintain the reactants at the required temperature of reaction in a hydrocarbon synthesis process.

Still another object is to increase the proportion of a catalyst chamber occupied by the catalyst in an exothermal process for optimum yield of product.

Another object of this invention is to provide a process and apparatus for the interaction of hydrogen and carbon monoxide in which at least a portion of the exothermic heat of reaction evolved is dissipated at latent heat of vaporization.

A further object of this invention is to provide a process for the reaction of hydrogen with carbon monoxide with a minimum formation of the normally gaseous hydrocarbons.

Other objects and advantages will become apparent to those skilled in the art from the accompanying description and disclosure.

According to this invention, thermal control in a process for the synthesis of hydrocarbons having more than one carbon atom per molecule from hydrogen and an oxide of carbon is achieved by introducing liquid mercury directly into the reaction zone of the process. The function of the liquid mercury is to remove, as sensible heat or latent heat of vaporization or both, excess heat liberated by the exothermic hydrocarbon synthesis reaction, thus preventing an undesirable temperature rise during the reaction.

In the preferred embodiment of the present invention, liquid mercury which is cooler than the temperature of the gases within the reaction zone is introduced into the upper portion of a vertical reaction chamber. The liquid mercury flows downward over the catalyst contained in the chamber to the lower portion of the chamber in direct heat exchange with the reacting gases therein. The flow of the gases within the reaction chamber may be either concurrent or countercurrent to the flow of the liquid mercury down the column. When the removal of the excess exothermic heat of reaction is accomplished primarily by removal as sensible heat of the liquid mercury, it is preferable to have countercurrent flow of gases and mercury. However, when the temperature of reaction is sufficiently high that a large portion of the mercury will be vaporized and thus removing the exothermic heat of reaction as latent heat of vaporization of the mercury, it is preferable to introduce the synthesis gas near the upper portion of the reaction chamber resulting in concurrent flow or reacting gases and mercury.

Any suitable method for introducing and dispersing or distributing the liquid mercury in the reaction chamber may be used, such as by spraying or by atomizing, without departing from the scope of the invention.

Generally, either the quantity or temperature of liquid mercury introduced into the reaction chamber is regulated such that only the necessary amount of heat is removed from the reaction chamber above that required to maintain the desired reaction temperature. When the desired reaction conditions, such as temperature and pressure, are such that little if any liquid mercury is vaporized and the heat of reaction is removed principally as sensible heat of the liquid mercury, the temperature of the entering liquid mercury is controlled. On the other hand, when the conditions of reaction are such that a large portion of the liquid mercury is vaporized, thus removing the heat of reaction as latent heat, the quantity rather than the temperature of entering liquid mercury is controlled. In either case, however, it is desirable to maintain the temperature of the entering liquid mercury substantially below the temperature of the reacting gases within the reaction chamber, preferably below about 60° C. Regulating both the quantity and the temperature of the mercury simultaneously to correspond to the requirements for removal of heat from the reaction chamber may be preferred in some instances.

Unvaporized mercury is discharged from the lower portion of the reaction chamber, then cooled and recycled. Vaporized mercury is discharged with the conversion effluent from the reaction chamber and passed to a condenser where the mercury vapors are condensed. The condensed mercury may be further cooled and recycled to the reaction chamber.

Mercury is particularly suitable as a direct heat exchange medium since it is a liquid at ordinary temperatures and can thus be easily handled. Mercury is also inert with regard to the synthesis reaction and possesses a relatively high heat capacity per unit volume.

Other metals which are inert in the synthesis reaction and are in a molten or liquid state in the range of temperatures normally used in effecting the hydrogenation of carbon monoxide may be used in cooling the reaction chamber in a similar manner, as hereinbefore described with regard to mercury, without departing from the scope of this invention. Other metals which may be used alone or in combination are lead, tin, zinc, etc.

The invention may be applied to a fluid catalyst system and to a moving bed catalyst system as well as to a fixed bed catalyst system. In most instances the catalyst bed itself provides sufficient obstruction to the flow of liquid mercury down the chamber to retain the mercury in the chamber a sufficient time to absorb the necessary heat. However, baffles or the like may be supplied to the chamber to assure sufficient contact time between the mercury and the reacting gases.

Direct cooling with liquid mercury may be used in combination with external cooling means, if desired. For example, a cooling jacket may surround the reaction zone through which jacket is passed a suitable fluid medium, such as water, mineral seal oil, etc., to remove a portion of the endothermic heat as sensible heat of the fluid medium.

In practicing this invention, it is possible to use reaction chambers considerably larger in diameter than those normally used in the hydrogenation of carbon monoxide while comparable yields of valuable hydrocarbon products are obtained without the production of abnormal quantities of methane and other undesirable normally gaseous hydrocarbons.

Appropriate catalysts are those which have substantial hydrogenating power at low temperatures. Such catalysts comprise a metal or compound of a metal from group VIII of the periodic table, such as iron, cobalt and nickel. Cerium, manganese, titanium, zinc, thorium, and the oxides and other compounds of these metals have also been found to possess the necessary characteristics suitable for hydrogenating carbon monoxide to hydrocarbons. Mixtures of such catalysts may be employed or suitable agents or carriers may be impregnated with the catalysts to increase their efficiency and strength. The catalysts are usually in a finely divided form, such as pellets or granules.

Tables I and II below show the reaction conditions of temperature, pressure, space velocity and compositions characteristic of some of the various catalysts which may be used in effecting the synthesis of hydrocarbons having more than one carbon atom per molecule. Table I shows composition of the catalyst and the appropriate reaction temperature. Table II shows the appropriate reaction pressure and space velocity, and the anticipated product.

TABLE I

*Properties and preferred ranges of operation of some common catalysts for the production of synthetic hydrocarbons*

| | Catalyst | Composition, Parts by weight | Temperatures, °C. | |
|---|---|---|---|---|
| | | | Broad Range | Pref. Range |
| 1 | Cobalt-Thoria | Co—100; ThO$_2$–18; Diatomaceous Earth–100 | 180–250 | 190–210 |
| 2 | Iron-Alkali and/or Copper | Alkali <2 wt. percent; Copper 15–25 wt. percent | 210–280 | 230–260 |
| 3 | Sintered Iron | All Iron; Traces of Alkali–1 wt. percent | 265–350 | 310–330 |
| 4 | Ruthenium | Ruthenium on support; Ru=10 wt. percent | 180–250 | 190–210 |
| 5 | Nickel-Thoria | Ni—100; ThO$_2$–18; Diatomaceous Earth–100 | 175–220 | 190–210 |
| 6 | Nickel-Manganese-Alumina | Ni—59; Mn$_3$O$_4$–50; Al$_2$O$_3$–51, Diatomaceous Earth–24 | 175–220 | 190–210 |
| 7 | Cobalt | Less than 10 percent by weight of extraneous material | 175–220 | 180–200 |

TABLE II

| | Catalyst | Pressures, p. s. i. g. | | Space Velocities, vol./vol. catalyst/hr. | | Anticipated Products |
|---|---|---|---|---|---|---|
| | | Broad Range | Pref. Range | Broad Range | Pref. Range | |
| 1 | Cobalt-Thoria | 15–500 | 100 | 80–150 | 90–110 | Light hydrocarbons to waxes. |
| 2 | Iron-Alkali and/or Copper | 15–500 | 75–300 | 80–150 | 90–110 | Do. |
| 3 | Sintered Iron | 15–500 | 220–300 | [1] 200–400 | 250–300 | Do. |
| 4 | Ruthenium | 1,000–2,000 | 1,200–1,500 | 80–150 | 90–110 | Predominantly waxes. |
| 5 | Nickel-Thoria | 15–100 | 15–50 | 80–150 | 90–110 | Light hydrocarbons to waxes. |
| 6 | Nickel-Manganese-Alumina | 15–100 | 15–50 | 80–150 | 90–110 | Do. |
| 7 | Cobalt | 15–500 | 100 | 80–150 | 95–115 | Do. |

[1] Recycle to feed ratio 25–100:1.

The sintered iron catalyst is prepared by heating to 500–600° C. in an atmosphere of hydrogen. The catalyst is not as sensitive to temperatures. Iron is precipitated with ammonia or caustic soda.

The best forms of the nickel-thoria catalyst are obtained by co-precipitating with potassium carbonate and heating with boiling water for the partial decomposition of the carbonate.

In general, the temperature range for the various catalyst which may be used to effect a synthesis of hydrocarbons is between about 150 and 400° C.

In carrying out the process of this invention, pressures ranging from sub-atmospheric to as high as about 2000 pounds per square inch gage may be used, but the preferred range is from about 50 to about 500 pounds per square inch gage, more particularly from about 100 to about 125 pounds per square inch gage.

Space velocities may be varied over a considerable range from low velocities of approximately 80 cubic feet per cubic foot of catalyst per hour such as are used normally over cobalt catalysts, up to about 400 or even as high as 30,000 cubic feet per cubic foot of catalyst per hour, such as are used over the sintered iron catalysts. These values represent the extremes in space velocities which may be used in carrying out this invention. Space velocity may be defined as volumes of gas at standard conditions of temperature and pressure per volume of catalyst per hour.

The composition of the synthesis feed gas is normally in a molar ratio of hydrogen to carbon monoxide between about 3 to 1 and about 1:1, however, for optimum yield of normally liquid hydrocarbons a ratio between about 2:1 and about 3:2 is preferred.

Upon use the catalysts may decrease in activity as the result of deposition of carbonaceous deposits thereon. Regeneration of the catalysts may be effected in conventional manner, such as by treatment with hydrogen at elevated temperatures.

By the process of this invention higher yields have been observed than obtained by conventional methods. Of the total hydrocarbon product, the normally liquid hydrocarbons constituted as high as about 65 to 75 per cent by weight.

The drawing diagrammatically represents an arrangement of apparatus for a typical process for the synthesis of hydrocarbons in which an embodiment of the present invention is applicable. Figure 1 illustrates one embodiment and Figure 2 illustrates another embodiment of the present invention.

In order that this invention may be more clearly understood and its applicability realized, a brief description of a typical process for the synthesis of hydrocarbons will be presented. Referring to Figure 1, natural gas containing methane, steam and carbon dioxide obtained from suitable sources are introduced into reactor 8 through lines 5, 6 and 7, respectively. Hydrogen and carbon monoxide are formed in reactor 8 in the presence of a suitable catalyst, such as nickel, at approximately atmospheric pressure and at a temperature between about 700 and about 800° C. The effluent from reactor 8 contains hydrogen and carbon monoxide in a molar ratio of about 2:1, and about 0.5 to about 1.0 mole per cent impurities, such as sulfur.

From reactor 8, the effluent passes to sulfur removal unit 12 by line 9 and through cooler 11. Both inorganic and organic sulfur are removed from the effluent in unit 12 by conventional methods known in the art. Inorganic sulfur may be removed by solvent extraction with a solvent, such as an amine solution. Organic sulfur compounds are decomposed in the presence of a suitable catalyst, for example a copper oxide-lead chromate combination, at an elevated temperature of about 400° C. The resulting hydrogen sulfide from the decomposition is removed by solvent extraction. The purified effluent of hydrogen and carbon monoxide is then passed to heater 14 by line 13 and thence to reactor 17 by line 16.

In reactor 17, hydrocarbons are synthesized under reaction conditions similar to those previously described and in the presence of a suitable catalyst, such as sintered iron, cobalt-thoria, etc. Excess exothermic heat of reaction beyond that required to maintain the desired reaction temperature, for example 225° C., is removed as sensible heat of liquid mercury introduced into reactor 17 at about 60° C. or below through line 19. If desired some heat of reaction may be removed by external cooling means or jacket, not shown. Reactor 17 contains a suitable catalyst for the synthesis of hydrocarbons, as previously discussed and shown in Tables I and II.

From reactor 17 a vaporous effluent containing hydrocarbons and any vaporized mercury is passed via line 18 to cooler 31 where partial condensation is effected, and the condensate is collected in accumulator 32 and discharged therefrom through lines 33 and 34. This condensate comprises heavy hydrocarbons or waxes and condensed mercury. The temperature of the effluent gases leaving reactor 17 is about 235° C. and cooling the gases to about 150° C. is sufficient to accomplish the degree of partial condensation desired resulting in the condensation of waxes and mercury vapor only.

Liquid mercury from the lower portion of reactor 17 and mercury from accumulator 32 are passed through lines 23 and 33, respectively, to mercury reservoir 24. Valve 35 on line 33 is attached to a liquid level indicator to maintain a predetermined mercury level in accumulator 32. In this manner only heavy hydrocarbons or waxes are withdrawn from accumulator 32 through line 34 and only mercury is withdrawn through line 33. Mercury in the desired quantity is recycled to the upper portion of reactor 17 by means of pump 27 and lines 26, 29 and 19. Recycled mercury is cooled to the desired temperature by cooler 28 before being introduced into reactor 17. The mercury is sprayed or otherwise distributed in reactor 17 in a conventional manner by a distribution means 21. Liquid mercury flows downward to the lower portion of reactor 17 and is withdrawn through line 23.

The uncondensed gases from accumulator 32 are passed through line 36 to cooling tower 38 wherein the gases are condensed by a spray of water which cools them to about 25° C. Water and liquid hydrocarbons are withdrawn from tower 38 through line 39 and are passed to settler 41 for a liquid phase separation between hydrocarbons and water. A portion of the uncondensed gases from accumulator 32 may be recycled through line 37 to reactor 17, if desired.

Figure 2 is a preferred modification of the present invention as applied to the process illustrated in Figure 1. In Figure 2 reactor 17 is divided into a plurality of catalyst zones 86. Liquid mercury is introduced into reactor 17 above each catalyst zone 86 through lines 19, 81 and 82 and distribution means 21, 83 and 84, respectively. From reactor 17 liquid mercury is passed through line 23 to reservoir 24. The effluent containing mercury vapor from reactor 17 is passed through line 18, condenser 31 to accumulator 32. Condensed mercury is withdrawn from accumulator 32 and passed through line 33 to reservoir 24. Mercury is recycled in the desired quantity to reactor 17 by means of pump 27 in a similar manner as described with reference to Figure 1. By multipoint introduction of mercury into reactor 17 as shown accurate control of the reaction temperature can be made.

In Figure 1 uncondensed gases leave settler 41 through line 42 and pass to mineral seal oil absorber 43. Recovery of propane, butane and heavier hydrocarbons is effected in absorber 43 by absorption of these hydrocarbons in mineral seal oil in the conventional manner. The hydrocarbon-rich mineral seal oil is withdrawn from the lower portion of absorber 43 and passed to a stripping column 46 via line 44. The light hydrocarbons, such as propane, butane, etc., are stripped from the mineral seal oil by lowering the pressure or heating in stripping column 46. Recovered hydrocarbons from stripping column 46 are passed via line 48 and condenser 49 to accumulator 51. Stripped mineral seal oil is recirculated to absorber 43 by means of line 52. Light gases such as hydrogen, methane, carbon monoxide, are removed from absorber 43 through line 53 and discarded or used as fuel, if desired. These gases may also be passed to a second and smaller reactor (not shown) for the conversion of the remaining hydrogen and carbon monoxide to hydrocarbons. Light gases may also be vented from the system, if desired, through line 54.

Liquid hydrocarbons from settler 41 and accumulator 51 are passed via lines 56, 57, and 58 to fractionation unit 59 wherein desired products are separated and recovered. Light gases are withdrawn from fractionation unit 59 through line 61. A naphtha fraction boiling within the gasoline range is withdrawn through line 62, and heavier hydrocarbons are removed by line 63, as a heavy cracking stock.

*Example*

A synthesis gas comprising two moles of hydrogen per mole of carbon monoxide is reacted to form normally liquid hydrocarbons at a temperature of about 225° C. and about 125 pounds per square inch gage in the presence of a cobalt-thoria synthesis catalyst. The exothermic heat of reaction is removed and the temperature maintained constant partially by introducing liquid mercury into the reaction chamber. In order to hold the temperature substantially constant at 225° C., about 5.5 gallons of liquid mercury at a temperature of about 38° C. per pound of normally liquid hydrocarbon formed is introduced into the reaction chamber. The effluent is condensed, and the components separated therefrom, including any mercury which is vaporized in the reaction chamber. The mercury is recycled to the reaction chamber. Mercury is also withdrawn from the lower portion of the reaction chamber and after cooling to about 38° C. is recycled to the reaction chamber. An analysis of the converted products shows 70 per cent conversion. The composition of the converted products is as follows: A light boiling hydrocarbon fraction comprising 86 weight per cent of the total, and including hydrocarbons ranging from propane to hydrocarbons having a boiling point of about 200° C. The heavier fraction of 14 weight per cent of the total comprises 13 per cent liquid hydrocarbons having an initial boiling point of about 200° C. and 1 weight per cent waxes.

Various pieces of equipment, such as coolers, heaters, heat exchangers, valves and controls, have been omitted as a matter of convenience and the inclusion of such equipment in various points in the process will become apparent to those skilled in the art. The present invention may be varied widely and various modifications will become apparent to those skilled in the art without departing from the scope thereof.

I claim:

1. In the process for the synthesis of hydrocarbons having more than one carbon atom per molecule which comprises passing a gaseous mixture comprising hydrogen and carbon monoxide into the lower portion of a reaction zone in the presence of a fixed bed synthesis catalyst, maintaining the molar ratio of hydrogen to carbon monoxide in said gaseous mixture entering said reaction zone between about 3:1 and about 1:1, maintaining a pressure in said reaction zone between about 15 and about 500 pounds per square inch gage, maintaining a temperature in said reaction zone between about 150 and about 400° C., maintaining a space velocity of gases in said reaction zone between about 100 and about 400, withdrawing an effluent from the upper portion of said reaction zone containing hydrocarbons, and separating said hydrocarbons from said effluent, the improvement which comprises introducing liquid mercury at a temperature below about 60° C. into the upper portion of said reaction zone in an amount sufficient to maintain the temperature substantially constant in said reaction zone during said synthesis, gravitating said mercury through said reaction zone in direct contact with the catalyst therein, withdrawing liquid mercury from the lower portion of said reaction zone, cooling mercury withdrawn from said reaction zone, and recycling same to said reaction zone.

2. In a process for the synthesis of hydrocarbons having more than one carbon atom per molecule which comprises passing a gaseous mixture comprising hydrogen and carbon monoxide into the lower portion of a reaction zone in the presence of a fixed bed synthesis catalyst, maintaining the molar ratio of hydrogen to carbon monoxide in said gaseous mixture entering said reaction zone between about 3:1 and about 1:1, maintaining a pressure in said reaction zone between about 15 and about 500 pounds per square inch gage, maintaining a temperature in said reaction zone between about 150 and about 400° C., maintaining a space velocity of gases in said reaction zone between about 100 and about 400, withdrawing an effluent from the upper portion of said reaction zone containing hydrocarbons, and separating said hydrocarbons from said effluent, the improvement which comprises introducing liquid mercury into the reaction zone containing a plurality of vertically spaced catalyst zones containing fixed synthesis catalyst at a temperature substantially lower than the temperature in said reaction zone and in an amount sufficient to maintain the temperature of said reaction zone substantially constant during said synthesis, said mercury being introduced into said reaction zone at a plurality of points adjacent the upper portion of each of said catalyst zones, gravitating said mercury in direct contact with said catalyst, withdrawing mercury from said reaction zone, cooling said mercury withdrawn from said reaction zone, and recycling same as a liquid to said reaction zone.

GEORGE G. OBERFELL.

REFERENCES CITED

The following references are of record in the file of this patent:

UNITED STATES PATENTS

| Number | Name | Date |
|---|---|---|
| Re. 16,824 | Canon | Dec. 20, 1927 |
| 1,900,715 | Jaeger | Mar. 7, 1933 |
| 2,167,004 | Pier et al. | July 25, 1939 |
| 2,354,353 | Abrams | July 25, 1944 |
| 2,406,851 | Redcay | Sept. 3, 1946 |
| 2,411,760 | Sensel | Nov. 26, 1946 |

FOREIGN PATENTS

| Number | Country | Date |
|---|---|---|
| 474,191 | Great Britain | Oct. 27, 1937 |